July 10, 1956
J. R. OISHEI
2,753,584
CABLE DRIVE WINDSHIELD CLEANER
Filed Dec. 1, 1954
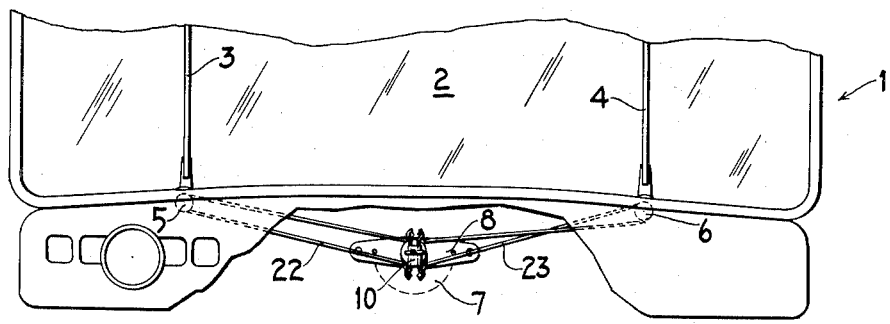
Fig.1
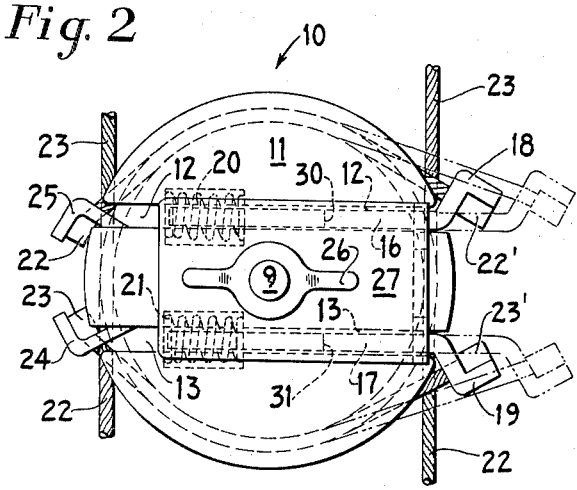
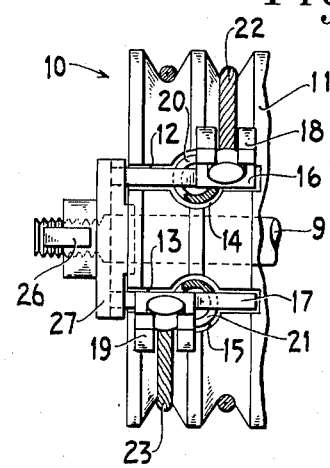
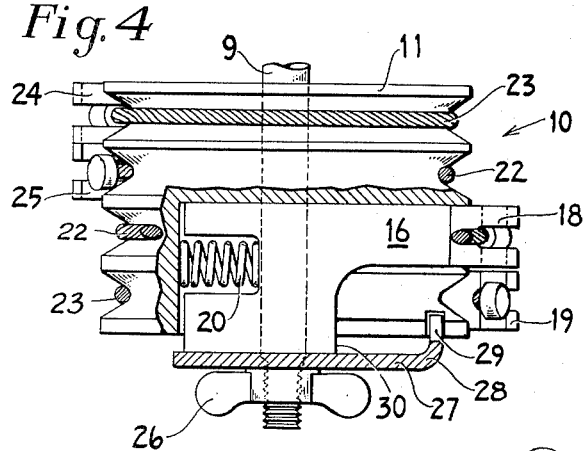
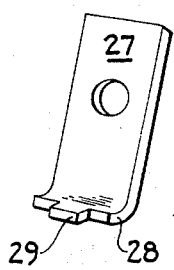
Fig.5
INVENTOR.
John R. Oishei
BY
Bean, Brooks, Buckley & Bean
Attys.

United States Patent Office 2,753,584
Patented July 10, 1956

2,753,584

CABLE DRIVE WINDSHIELD CLEANER

John R. Oishei, Buffalo, N. Y., assignor to Trico Products Corporation, Buffalo, N. Y.

Application December 1, 1954, Serial No. 472,323

16 Claims. (Cl. 15—253)

This invention relates to the automotive art and more particularly to a windshield wiper system that utilizes a cable transmission for imparting the oscillatory motion to the wipers. It has heretofore been proposed, as evidenced by the earlier granted Reissue Patent No. 23,580, to employ a spring actuated cable tightener to obtain a predetermined tautness in the cable transmission, and then to fixedly secure the adjustment for definitely holding the spring-determined tension for operating independently of the spring.

Present day windshield cleaners embody a flexible drive wherein cables are employed to transmit the oscillating motion of the wiper motor to the squeegee. If the system is to operate efficiently, the cables must not only be placed under proper tension when installed, but periodic adjustments must also be made to take up the slack resulting from the stretching of the cables while in use. As a means of time-saving during the initial installation it is desirable to employ potential tensioning means that are locked out of action so that parts can be fully assembled with cables slacked off for facility of installation and with provision to release the spring tightening means so that the spring determined tautness for operation can be quickly applied to the system and locked in operative relation. Likewise it is desirable to position the tensioner mechanism to make the manipulation of the tensioning means readily accessible for readjustment and for further take up of the cable system in service.

Accordingly, it is a primary object of the present invention to provide a tensioner for a wiper system whereby the cables may be placed under the proper amount of tensioning by a simple manipulation directly following the anchoring of the cable ends in place. All flights of the cable transmission are tensioned concurrently and uniformly by a single operator through the use of a unitized tensioning member. The immobilizing of the movable parts, by means of which cable slack is uniformly taken up, is to be accomplished by friction means preferably devoid of mating serrations which latter fixedly determine the interlocking points to the fineness of the serrated faces that may possibly detract somewhat from uniformity in tautness.

In the instant structure a movable take up means is provided in the form of movable members working across the periphery of a drum in chordal or radial recesses and each having a cable receiving forked claw on the outer end to engage one end of a cable. When released, these cable anchoring slidable members act crosswise of the flights under the urge of spring means to bodily lift the adjacent portions of the cables off the drum thereby reducing the cable wrap-around. The tautness of the cables is then fixed by simultaneously locking the cable anchoring members in their respective slots with a single immobilizing means arranged for dependable operation without the use of tools.

A further object of the invention is to provide a windshield cleaning system of the cable transmission type wherein the cable slack is taken up by acting to draw cable portions axially about and relative to the driving drum to obtain a predetermined uniformity of tautness in the power transmitting cable portions.

For a beter understanding of the objects of the invention, reference is made to the following specifications and accompanying drawing wherein:

Fig. 1 is a diagrammatic view of an automotive vehicle having a windshield cleaning system equipped with cable tensioning means constructed in accordance with the instant invention;

Fig. 2 is a front elevational view of the tensioner drum indicating in phantom section the manner in which slack is taken up;

Fig. 3 is a fragmentary bottom view of the tensioner;

Fig. 4 is a side elevational view, partly in section, of the tensioner; and,

Fig. 5 is a perspective view of the pressure plate.

Referring now more particularly to the drawing, the numeral 1 generally indicates an automotive vehicle having a windshield 2 and wipers 3 and 4, the latter carried respectively on rockshafts 5 and 6. Motor 7 which may be of the conventional vacuum pressure type is mounted on the firewall of the vehicle by means of bracket 8. The drive shaft 9 of the motor extends through the firewall into the passenger compartment of the vehicle and carries tensioner 10 on its inboard end.

The tensioner comprises a drum 11 having a plurality of grooves on its periphery and a pair of preferably chordal slots 12 and 13 having circular bores 14 and 15. Anchoring posts 16 and 17 having forked claws 18 and 19 on their outboard ends are carried in the slots. Compression springs 20 and 21 located in bores 14 and 15 urge the anchoring posts outward. In lieu of these two springs, a single larger spring may be substituted in an enlarged single chamber or bore underlying both posts to act jointly thereon. Cable 22 anchored in forked claw 18, passes along one of the grooves on the periphery of drum 11 and out tangentially toward rockshaft 5 to which it is operatively connected in a conventional manner. The cable is then led back toward drum 11 and anchored to claw 25 fixed to the drum. Similarly, cable 23 anchored in claw 19 is operatively connected to rockshaft 6 and led back to drum 11 where it is anchored by claw 24. The claws 18 and 19 may be reversely arranged, if desired, to cause the cables to pull the posts toward and against the intervening body portion of the drum.

Activation of motor 7 causes its rockshaft to oscillate. This motion is transmitted to the wipers 3 and 4 via drum 11, the cables 22 and 23 and rockshafts 5 and 6. When the cables become too slack to properly transmit the motion, it is merely necessary to turn wing nut 26 so as to relieve the pressure between posts 16 and 17 and pressure plate 27. Springs 20 and 21 then force the posts outward so as to take up the slack in the cables as is shown in phantom in Fig. 2. In this connection, it will be noted that as the cable positioning posts move outwardly they serve to lift the adjacent cable portions off the drum and thereby decrease the extent of their wrap to lessen their hold upon the periphery of the drum. This facilitates the peripheral slipping of the cables under the urge of the spring means 20, 21 to absorb the slack in the transmission.

In order to prevent the posts from being forced completely out of the slots by the springs, the inturned end 28 of the pressure plate is employed as a positive stop. Tongue 29 of the plate is located in a mating slot in the drum so as to position the plate. In the event that the slack in the cables becomes excessive to the point where it cannot counterbalance the spring pressure, the positive stop comes into play. When the posts have been forced out of the drum to the practical limit, shoulders 30 and 31 of the posts abut the inturned end 28 of the pressure plate and can move no further. The spring is made sufficiently stiff to place the cables under the desired amount of tension when the system is inactive. However, such pressure is considerably less than the tension to which the cables are normally subjected when the system is active. Accordingly, and after the slack is taken out of the cables wing nut 26 is turned down so as to force plate 27 into engagement with the posts as best seen in Fig. 4. The pressure so created is sufficient to hold the posts in place in spite of any force to which the post may reasonably be expected to be subjected by the cables in normal operation. This provision is necessary in order to prevent the posts from being forced downward against the resistance of the springs by the cables when such cables are placed under driving tension by the motor.

A principal advantage in the structure shown resides in the chordal positioning of the slidable cable anchoring and positioning posts which, when moved outwardly at an oblique angle to the grooved surface of the drum, presents a substantially rigid surface contact on the side walls of the slots to take the tension thrust of the cable in a manner that produces a lateral clutching action not present in the direct thrust of the spring members 20 and 21 but additive thereto to cooperate with the frictional hold 26, 27. This frictional hold resulting in the side binding of the anchoring posts upon the side walls of the slots will increase progressively as the posts gradually work their way outwardly under repeated slack absorbing adjustments. Thus it will be seen that, once the tensioning is set up, the required frictional locking force is minor since the tendency of the anchoring post is to become interlocked by the clutching counteracting force of the tensioning cables, therefore requiring only a minor pressure of the manual locking means to maintain the spring determined tautness for operation independently of the spring.

The compactness of the unitized tensioner, in making readily accessible the manual interlocking cam-like lock of the thumb nut, is advantageous over other forms of tensioning means located remotely of the central driving drum. In these earlier instances where the tensioning is combined with an idler in some instances and in other instances combined with the driven arm pivot shaft members, it is necessary to resort to a second operation on each side of the vehicle to separately tension each of the driven drums. This is accomplished in one form by a manual control means extending from inside to outside the car body, but such tensioning is a triple operational procedure at the time of installing the wiper set including an interlocking achievable by serrated surfaces extending radially of the driven shaft wherein subject radial tensioning means must in all instances be tightly interlocked by the screw means or other means employed to insure the engagement of the serrated faces of the divided members thus employed. For the reason stated and other reasons apparent, the unitized centrally located tensioner with the slots extending chordally of the drum and having the clutchlike interlocking action in the slots, presents a preferred means for the desired end of initially tensioning, and retensioning the cable-pull wiper sets.

The cable anchoring enlargements 22', 23' may be engaged in claws or seats fixed on the periphery of the drum and the adjacent cable portions guided through the claws 18, 19 on the outer ends of the posts to slide therein during their slack absorbing movement. The slots 12 and 13 may extend radially, if desired, and likewise the posts may, if desired, be hinged to the periphery of the drum to swing their cable supporting ends outwardly under their spring urge, the inner ends of the pivoted posts being frictionally embraced by the clamping pressure plates.

It may therefore be seen that by simply loosening the wing nut the cables will automatically be placed under the proper amount of tension by the springs urging the posts outward. The wing nut is then tightened to maintain the posts in their proper position. The superiority of this arrangement should be obvious when it is contrasted with pre-existent systems which required blind groping under the instrument panel or in the engine compartment of the vehicle. In the present system the tensioning operation may be carried out by the simple twisting of an easily accessible wing nut. Further, in the present system the amount of tension imparted to the cables is automatically determined, no reliance upon the discretion, intuition or skill of the operator being necessary.

What is claimed is:

1. A windshield cleaning system for automotive vehicles, comprising a plurality of wipers for cleaning an associated windshield, a motor for driving said wipers to and fro across the windshield, a tensioner including a drum drivingly connected to said motor, a plurality of chordal anchoring posts telescoped into said drum, a plurality of flexible cables, said cables connecting the posts with said wipers, each of said cables being anchored to at least one of said posts and operatively connected to at least one of said wipers, and means for urging the anchoring posts out of said drum.

2. A windshield cleaning system for automotive vehicles, comprising a plurality of wipers for cleaning an associated windshield, a motor for driving said wipers to and fro across the windshield, a tensioner including a drum drivingly connected to said motor, said drum having a plurality of chordal slots, an anchoring post telescoped into each slot, a plurality of flexible cables, said cables connecting the posts with said wipers, each of said cables being anchored to at least one of said posts and operatively connected to at least one of said wipers, and means for urging the anchoring posts out of said drum.

3. A windshield cleaning system for automotive vehicles, comprising a plurality of wipers for cleaning an associated windshield, a motor for driving said wipers to and fro across the windshield, a tensioner including a drum drivingly connected to said motor, a plurality of chordal anchoring posts telescoped into said drum, a plurality of flexible cables, said cables connecting the posts with said wipers, each of said cables being anchored to at least one of said posts and operatively connected to at least one of said wipers, means for urging the anchoring posts out of said drum, and additional means for immobilizing said anchoring posts.

4. A windshield cleaning system for automotive vehicles, comprising a plurality of wipers for cleaning an associated windshield, a motor for driving said wipers to and fro across the windshield, a tensioner including a drum having a plurality of chordal slots, an anchoring post telescoped into each slot, a plurality of flexible cables, said cables connecting the posts with said wipers, each of said cables being anchored to at least one of said posts and operatively connected to at least one of said wipers, means for urging the anchoring posts out of said drum, and additional means for immobilizing said anchoring posts.

5. A windshield cleaning system for automotive vehicles, comprising a plurality of wipers for cleaning an associated windshield, a motor for driving said wipers to and fro across the windshield, a tensioner including a drum drivingly connected to said motor, said drum having a plurality of chordal slots, an anchoring post telescoped into each slot, a plurality of flexible cables, said cables connecting the posts with said wipers, each of said cables being anchored to at least one of said posts and operatively connected to at least one of said wipers, means for urging the anchoring posts out of said drum, and additional means for immobilizing said anchoring posts, said additional means including a positive stop for preventing the complete withdrawal of said anchoring posts from the chordal slots.

6. A windshield cleaning system for automotive vehicles, comprising a plurality of wipers for cleaning an associated windshield, a motor for driving said wipers to and fro across the windshield, a tensioner including a drum drivingly connected to said motor, a plurality of chordal anchoring posts telescoped into said drum, a plurality of flexible cables operatively connecting said wipers to said posts, means for urging the anchoring posts out of said drum, and additional means for immobilizing said anchoring posts, said additional means including a positive stop for preventing the complete withdrawal of said anchoring posts from the chordal slots.

7. A windshield cleaning system for automotive vehicles comprising a plurality of wipers for cleaning an associated windshield, a motor for driving said wipers to and fro across the windshield, a tensioner including a drum drivingly connected to said motor, said drum having a plurality of peripheral grooves, a plurality of chordal anchoring posts telescoped into said drum and intersecting said grooves at an oblique angle, a plurality of flexible cables wrapped at least part way about said drum in said grooves and operatively connecting said posts to said wipers, and means for urging the anchoring posts out of said drums so as to take up any slack existent in said cables.

8. A windshield cleaning system for automotive vehicles, comprising a plurality of wipers for cleaning an associated windshield, a motor for driving said wipers to and from across the windshield, a tensioner including a drum drivingly connected to said motor, said drum having a plurality of peripheral grooves and chordal slots, said chordal slots intersecting said grooves at an oblique angle, an anchoring post telescoped into each slot, a plurality of flexible cables wrapped at least part way about said drum in said grooves and operatively connecting said posts to said wipers, and means for urging the anchoring posts out of said drums so as to take up any slack existent in said cables.

9. A windshield cleaning system for automotive vehicles comprising a plurality of wipers for cleaning an associated windshield, a motor for driving said wipers to and fro across the windshield, a tensioner including a drum drivingly connected to said motor, said drum having a plurality of peripheral grooves, a plurality of chordal anchoring posts telescoped into said drum and intersecting said grooves at an oblique angle, a plurality of flexible cables wrapped at least part way about said drum in said grooves and operatively connecting said posts to said wipers, means for urging the anchoring posts out of said drum so as to take up any slack existent in said cables, and additional means for immobilizing said anchoring posts.

10. A windshield cleaning system for automotive vehicles, comprising a plurality of wipers for cleaning an associated windshield, a motor for driving said wipers to and fro across the windshield, a tensioner including a drum drivingly connected to said motor, said drum having a plurality of peripheral grooves and chordal slots, said chordal slots intersecting said grooves at an oblique angle, an anchoring post telescoped into each slot, a plurality of flexible cables wrapped at least part way about said drum in said grooves and connecting said posts to respective ones of said wipers, means for urging the anchoring posts out of said drums so as to take up any slack existent in said cables, and additional means for immobilizing said anchoring posts.

11. A windshield cleaning system for automotive vehicles comprising a plurality of wipers for cleaning an associated windshield, a motor for driving said wipers to and from across the windshield, a tensioner including a drum drivingly connected to said motor, said drum having a plurality of peripheral grooves, a plurality of chordal anchoring posts telescoped into said drum and intersecting said grooves at an oblique angle, a plurality of flexible cables wrapped at least part way about said drum in said grooves and operatively connecting the posts to respective ones of said wipers, means for urging the anchoring posts out of said drum so as to take up any slack existent in said cables, and additional means for immobilizing said anchoring posts, said adidtional means including a positive stop for preventing the complete withdrawal of said anchoring posts from the chordal slots.

12. A windshield cleaning system for automotive vehicles comprising a plurality of wipers for cleaning an associated windshield, a motor for driving said wipers to and fro across the windshield, a tensioner including a drum drivingly connected to said motor, said drum having a plurality of peripheral grooves and chordal slots, said chordal slots intersecting said grooves at an oblique angle, an anchoring post telescoped into each slot, a plurality of flexible cables wrapped at least part way about said drum in said grooves and operatively connecting the posts to respective ones of said wipers, means for urging the anchoring posts out of said drums so as to take up any slack existent in said cables, and additional means immobilizing said anchoring posts.

13. A windshield cleaning system for automotive vehicles, comprising a plurality of wipers for cleaning an associated windshield, a motor for driving said wipers to and fro across the windshield, a tensioner including a drum drivingly connected to said motor, a plurality of cable supporting members mounted on the drum for movement of one end outwardly from its periphery, a plurality of flexible cables operatively connecting the wipers to the drum and receiving support from said members, resilient means urging said members outwardly to absorb their slack, and means fixedly relating said members to said drum.

14. A windshield cleaning system comprising wiper means, a driving drum therefor, a cable transmission operatively connecting the wiper means to the drum, a cable supporting member mounted on the drum for outward movement from its periphery and operatively supporting the cable transmission for outward displacement to tension the same, resilient means urging the member outwardly, and locking means acting to fixedly relate the member on the drum against yielding to the resilient urge.

15. In a windshield wiper transmission mechanism, a drum having a peripheral groove, a cable making partial wrap around said drum, a cable supporting member movable on said drum in a direction to lift a portion of said cable out of said groove, spring means to effect such cable lifting movement of the supporting member, and manually releasable means to immobilize said member against movement either with or against said spring means.

16. In a windshield wiper transmission mechanism, a drum having a groove and a cable making partial wrap about said drum in said groove, a slide member arranged in said drum and supporting one end of said cable, spring means urging said slide member outwardly in a chordal direction to tension said cable, and means for releasably immobilizing said slide member against movement in either direction.

References Cited in the file of this patent

UNITED STATES PATENTS

| | | |
|---|---|---|
| Re. 23,580 | Rappl | Nov. 11, 1952 |
| 2,661,492 | Oishei | Dec. 8, 1953 |